Nov. 18, 1924.  1,515,906
J. R. STEEL
PROCESS FOR SMELTING ORES
Filed May 4, 1921
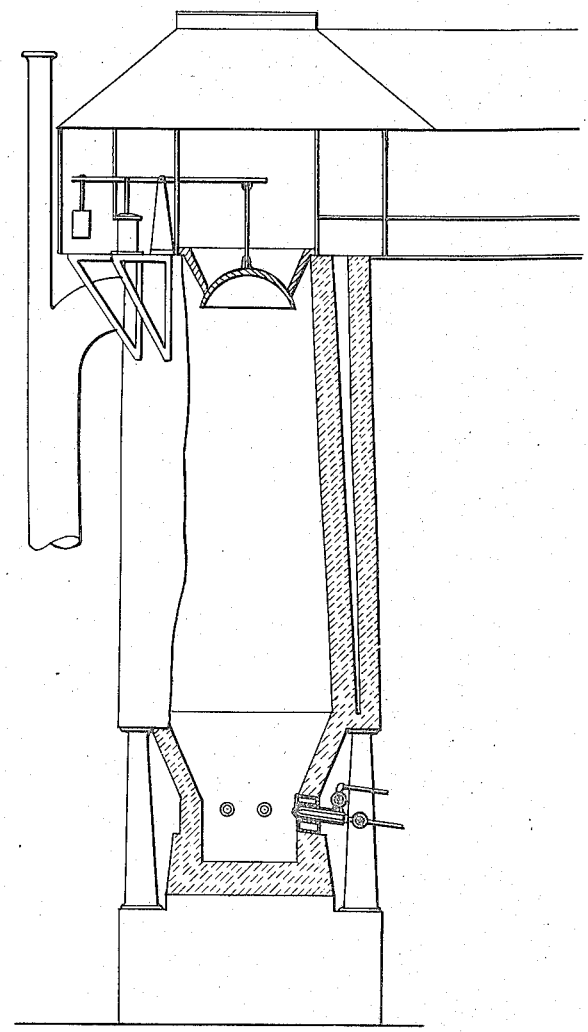
INVENTOR
JOHN R. STEEL
BY Chas. E. Townsend
ATTY.

Patented Nov. 18, 1924.

1,515,906

UNITED STATES PATENT OFFICE.

JOHN R. STEEL, OF SAN FRANCISCO, CALIFORNIA.

PROCESS FOR SMELTING ORES.

Application filed May 4, 1921. Serial No. 466,823.

*To all whom it may concern:*

Be it known that I, JOHN R. STEEL, a citizen of the United States, residing in the city and county of San Francisco and State of California, have invented new and useful Improvements in Processes for Smelting Ores, of which the following is a specification.

This invention relates to a process for smelting ores, particularly ores of the iron group; and one object is to provide a method for reducing the ores by subjecting the ore to the intense heat which is secured by burning hydrocarbons and pure oxygen gas within a furnace. Another object of the invention is to provide a method of the character described which permits the production either of pig iron, cast iron, wrought iron or steel in one operation. Further objects will hereinafter appear.

A standard type of blast furnace is illustrated in the accompanying drawing as such a furnace is suitable for conducting the present process.

In treating ores of the iron group, it is usual to first roast the ore in order to decompose the carbonates and oxidize the sulphides, the ore being then reduced with coke. Ores containing lime or magnesia are mixed with an acid flux, such as sand or clay slate, in order that a fusible slag may be formed. Conversely, ores containing silica and clay are mixed with limestone.

With a furnace constructed as shown in the accompanying drawing, it becomes possible to carry on the process continuously as the solid materials may be thrown in at the top of the furnace from time to time. The whole mass of ore slowly descends and gradually liberates the gases which escape and liquids (iron and slag) which are tapped off at the bottom. In operating an ordinary blast furnace it is necessary to mix the ore with a certain amount of coke to support combustion and it is also necessary to force heated air through tuyères formed near the bottom of the furnace to maintain an induced draft at all times.

While the present process might be more efficiently operated in another furnace, I have so far successfully employed a furnace of the type shown, using as a fuel nothing but crude oil and pure oxygen gas. The crude oil and oxygen gas are mixed in a burner of any suitable construction and the gas and oil are injected through the tuyères shown directly into the ore body. An enormous temperature is in this manner produced which rapidly reduces the ore.

In operating a furnace fed by fuel consisting of oil and oxygen gas I discovered that by varying the quantity of oxygen gas admitted it was possible to produce different products, to-wit, pig iron, cast iron, wrought iron and steel. A comparatively small amount of pure oxygen gas admitted produces pig iron, while a gradual increase in the amount of oxygen gas employed produces cast iron, wrought iron and steel. I also found that different grades of steel could be obtained, as the pure oxygen gas admitted seemed to reduce the carbon contents of the steel so that practically any percentage desired might be obtained merely by varying the volume of oxygen gas admitted.

I am aware that many attempts have been made to reduce iron ore by employing crude oil as a fuel, but these attempts have all been more or less failures. Most of the pig iron produced when employing crude oil as a fuel seems to be too spongy and contains too much carbon, silica, phosphorus and sulphur. This defect is entirely overcome in the present instance as the carbon, silica and phosphorus combine with the oxygen of the oxide, the last two passing into the slag and the sulphur being generally found in the slag as a ferrous sulphide.

The pure oxygen gas employed with my process is the essential element for the successful production of the different products as it permits the manufacture of steel in one operation directly from the ore or any other grade of iron from the pure pig and up.

While an ordinary blast furnace and a burner which permits mixing of oil and oxygen gas are here shown, I wish it understood that any suitable form of furnace may be employed and that the fuel oil and oxygen gas may be separately introduced, if desired.

Having thus described my invention, what I claim and desire to secure by Letters Patent is—

1. A process of smelting ores, which consists in subjecting the ore to heat produced by combustion of a hydrocarbon fuel and oxygen gas.

2. A process for smelting ores, which consists in subjecting the ore to the direct flame of burning oil and oxygen gas.

3. A process for producing cast iron, wrought iron or steel directly from an iron ore, which consists in subjecting the ore to the direct flame of burning oil and oxygen gas.

In testimony whereof I have hereunto set my hand in the presence of two subscribing witnesses.

JOHN R. STEEL.

Witnesses:
W. W. HEALLY,
M. E. IRVING.